Figure 4:
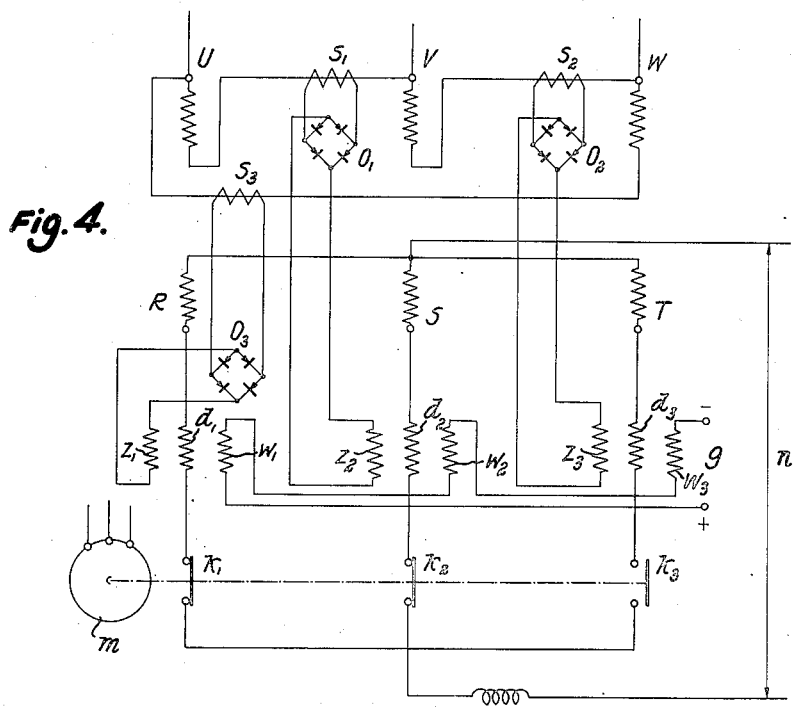

April 12, 1949.                L. PRATI                2,466,864
                          MECHANICAL CONVERTER
Filed Feb. 5, 1945                                2 Sheets-Sheet 1
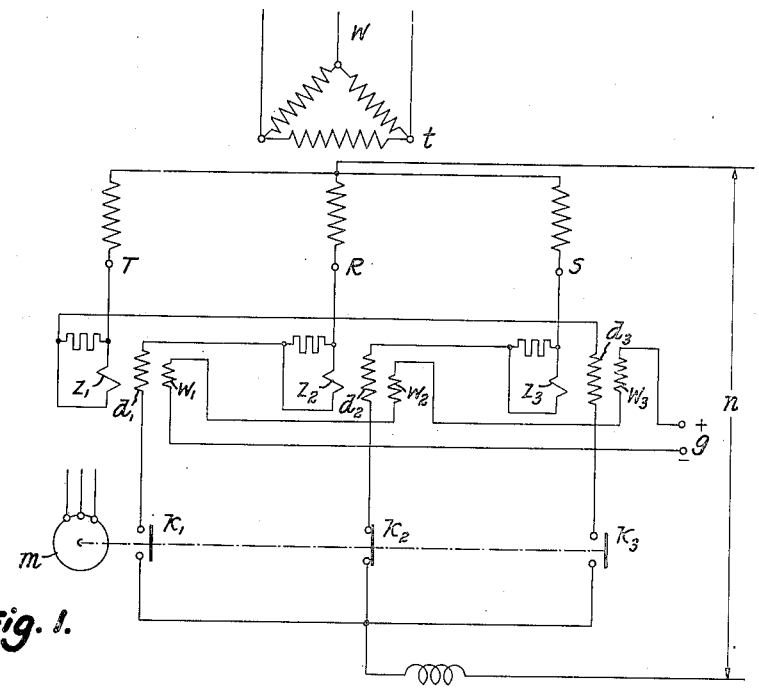
Fig. 1.
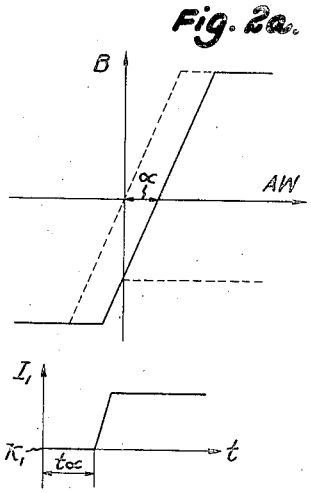
Fig. 2a.
Fig. 2b.
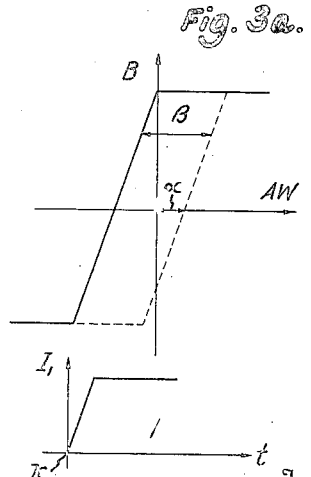
Fig. 3a.
Fig. 3b.
Inventor:
Libero Prati,
By Pierce & Scheffler,
Attorneys.

Patented Apr. 12, 1949

2,466,864

UNITED STATES PATENT OFFICE 2,466,864

MECHANICAL CONVERTER

Libero Prati, Baden, Switzerland, assignor to Aktiengesellschaft Brown, Boveri & Cie, Baden, Switzerland Application February 5, 1945, Serial No. 576,184
In Switzerland June 22, 1943

3 Claims. (Cl. 321—48)

The present invention concerns a moving contact electric current converter where the contacts are moved in synchronism with the phase voltage and where switching reactors are located in the leads to the contacts, these reactors being so dimensioned and constructed that due to a change in their saturation conditions they produce a current-free interval during the commutating time and thus enable the contacts to open without sparking.

In order to be able to vary the commutating conditions of such mechanical converters in dependence on the changes in load, it has already been proposed to provide the reactors with additional excitation windings which are fed with a variable current. In order to vary the power output of the converter it has also been proposed that the premagnetisation of the reactors should be varied. The additional excitation windings are then fed from a direct or alternating current source, or the variable direct current pre-excitation has an alternating current pre-excitation superimposed on it. These kinds of mechanical converters also possess the diadvantage that when the commutating conditions are influenced it is also necessary to regulate the contact duration simultaneously and this complicates the mechanical construction of the converter.

The invention thus deals with a multi-phase mechanical converter having contacts which are moved synchronously with the phase voltage and switching reactors arranged in the leads to the contacts, these reactors having in addition to a constant direct current premagnetisation a supplementary variable premagnetisation, the aforementioned disadvantages of such arrangements being overcome according to the invention by the reactor associated with a phase which is about to be switched in being additionally premagnetised by the current of the phase which has to be switched out.

In the accompanying drawing, Fig. 1 shows in diagrammatic form a construction example of the invention, whilst Figs. 2a, 2b and 3a, 3b show curves of the magnetisation for no-load and load operation. Fig. 4 shows a modified form of the invention.

In Fig. 1 $k_1$, $k_2$, $k_3$ indicate the contacts of a three-phase converter, these contacts being periodically closed and open for instance by a synchronous motor $m$. The mechanical converter is connected to the alternating current network $w$ by the transformer $t$ and supplies the direct current network $n$. Switching reactors $d_1$, $d_2$, $d_3$ are located in the leads to the contacts. The reactors are provided with the premagnetising windings $w_1$, $w_2$, $w_3$ which are fed from the direct current source $g$ and also with the premagnetising windings $z_1$, $z_2$, $z_3$ which are supplied with current from the phase of the alternating current network $w$ which has to be switched out, that is to say the phase which at the moment is carrying current. For instance winding $z_1$ of reactor $d_1$ which is associated with phase R is supplied with current from phase T. This phase current has an impulse form with a maximum value equal to the load current. The switching reactors thus possess at the moment when the corresponding contacts close, a premagnetisation equal to the load current, on the other hand when switching out occurs the premagnetisation is zero.

During no-load operation only the constant direct current premagnetisation with $\alpha$ ampere-turns is effective and moves the magnetisation curve to the right (see Fig. 2a). The commutation process is thus displaced by a time $t_\alpha$ relative to the switching-in instant, this time being necessary for the reactor to become fully saturated. Fig. 2b shows the retarded rise of current $I_1$ over contact $k_1$ with a small load.

During load operation the magnetisation curve is moved to the left. This displacement is proportional to the load current and must be so selected that with full load the switching reactor is completely saturated when switching in (see Fig. 3a). Fig. 3b shows the corresponding current-time diagram for the current which rises immediately the contact is closed.

With the arrangement described above there is no longer any need to regulate the contact duration, so that the mechanical construction of the converter becomes simpler. Furthermore there is no danger of a breakdown occuring when the load suddenly changes.

Instead of using the transformer secondary current of the phase which has to be switched out as the magnetising current for the reactor of the phase which has to be switched in, it is possible to employ the rectified primary current of the current-carrying phase of the supply transformer as the magnetising current for the reactor associated with the phase which has to be switched in, as shown in Fig. 4, where $s_1$, $s_2$, $s_3$ are the secondary windings of current transformers arranged in series with the primary windings of the supply transformer. These current transformers feed the reactor windings $z_1$, $z_2$, $z_3$ over the rectifiers $o_1$, $o_2$, $o_3$.

I claim:

1. In a converter device for use on a multi-phase alternating voltage source, switching means adapted to be connected in each of said phases, means actuating said switching means sequentially in and out in synchronism with their respective phase voltages, a switching reactor individual to each of said phases, each said reactor including a winding connected in series with the switching means of the associated phase, a first pre-magnetizing winding energized by direct current of a constant magnitude, a second premagnetizing winding, and means periodically establishing in the second premagnetizing winding on the reactor associated with a phase next to be switched in an energizing current proportional to and in phase with and derived solely from the current of the instant switched-in phase carrying the load and which is next to be switched out whereby the energization of the second premagnetizing winding of each reactor is limited to a period initiated prior to the switching in of the associated phase and terminated prior to the switching out of such phase.

2. A converter device as defined in claim 1 wherein said voltage source is constituted by a multi-phase transformer and the said second premagnetizing winding of the reactor associated with a phase next to be switched in is connected in circuit with that secondary of said transformer constituting the instant switched-in phase.

3. A converter device as defined in claim 1 wherein said voltage source is constituted by a multi-phase transformer and the means for periodically establishing an energizing current in the second premagnetizing winding comprising a rectifier having its output side connected to said second winding and its input side coupled to that primary of said transformer constituting the instant switched-in phase.

LIBERO PRATI.

REFERENCES CITED

The following references are of record in the file of this patent:

UNITED STATES PATENTS

| Number | Name | Date |
|---|---|---|
| 2,188,361 | Koppelmann | Jan. 30, 1940 |
| 2,298,130 | Janetschke | Oct. 6, 1942 |
| 2,351,975 | Koppelmann | June 20, 1944 |